(12) United States Patent
Lehner

(10) Patent No.: US 6,290,737 B1
(45) Date of Patent: Sep. 18, 2001

(54) DUST FILTER

(75) Inventor: Bernhard Lehner, St. Gallen (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 09/485,906

(22) PCT Filed: Apr. 14, 1998

(86) PCT No.: PCT/CH98/00139

§ 371 Date: May 5, 2000

§ 102(e) Date: May 5, 2000

(87) PCT Pub. No.: WO99/08774

PCT Pub. Date: Feb. 25, 1999

(30) Foreign Application Priority Data

Aug. 20, 1997 (DE) .............................................. 197 36 031

(51) Int. Cl.$^7$ .................................................. B01D 46/00
(52) U.S. Cl. ................................ 55/302; 55/283; 95/278; 95/280
(58) Field of Search ............................. 55/301, 302, 303, 55/283; 95/278, 279, 280

(56) References Cited

U.S. PATENT DOCUMENTS

| 4,247,310 | * | 1/1981 | Borst .................................. 55/303 |
| 4,433,986 | * | 2/1984 | Borst .................................. 55/302 |
| 5,022,897 | * | 6/1991 | Balcar et al. ...................... 95/279 |
| 5,328,492 | * | 7/1994 | Zievers et al. ..................... 55/302 |
| 5,458,665 | * | 10/1995 | Martin et al. ..................... 55/302 |
| 5,514,195 | * | 5/1996 | Durst et al. ....................... 55/302 |
| 6,149,716 | * | 11/2000 | Bach et al. ........................ 95/280 |

FOREIGN PATENT DOCUMENTS

| 3045759 A1 | 6/1982 | (DE) . |
| 9012518 | 3/1991 | (DE) . |
| 4029994 A1 | 3/1992 | (DE) . |
| 94077980 | * 8/1994 | (DE) . |
| 9407798 | 9/1994 | (DE) . |
| 19512289 A1 | 10/1995 | (DE) . |
| 3939645 | 3/1996 | (DE) . |
| 2088634 | 12/1971 | (FR) . |
| 2088634A | * 1/1972 | (FR) . |
| 2397219A | * 2/1979 | (FR) . |
| 2397219 | 2/1979 | (FR) . |

OTHER PUBLICATIONS

International Search Report for PCT/CH 98/00139, date of mailing Aug. 7, 1998.
Statement of Relevance of DE–U–9012518.

* cited by examiner

*Primary Examiner*—David A. Simmons
*Assistant Examiner*—Minh-Chau T. Pham
(74) *Attorney, Agent, or Firm*—Finnegan, Henderson, Farabow, Garrett & Dunner, L.L.P.

(57) ABSTRACT

The present invention relates to a dust filter such as a hose filter which is mainly intended for cleaning primary gas containing dust or the like. The purpose of this invention is to simplify the cleaning process of the filter members and to reduce the design complexity for supplying pressurized gas thereto. To this end, the space above the cleaning gas nozzles is made in the shape of a pressure chamber, which reduces the need for the fittings and control devices.

13 Claims, 2 Drawing Sheets

DUST FILTER

BACKGROUND OF THE INVENTION

1. Field of Invention

The invention relates to a dust filter, e.g., bag filter, in particular its accommodation in a tank and valve. Such dust filters are used to remove dust from conveying air, etc.

2. Description of the Related Art

Dust filters include cartridge candle filters or bag filters. Bag filters include dust separators with tubular filter elements, e.g., made out of needled felt or treated fabric. The individual filtering bags are arranged in a shared casing, and form a raw gas room. The filtering bags are detachably connected to corresponding intermediate floors and, when suspended, the pure gas room is located above this intermediate floor, and can be connected using a valve arrangement to both to a scavenging air channel and a pure gas channel for removing the purified air. The lower area of the casing or raw gas room accommodates a discharge for removing the filtered dust.

Such bag filters are described in DE-A-3939645 or DE-A-4029994, for example.

In such a bag filter, the raw gas entering the raw gas room via the raw gas line arrives at the outer wall of a filtering bag, so that the particles entrained by the raw gas are held back by the filtering bag, and the pure gas rises inside the filtering bag, where it finally is evacuated in a pure gas line, and is again available for use. Larger particles fall downward inside the raw gas room, and are removed in the floor area of the filter, e.g., by means of a cellular wheel sluice. Smaller particles initially accumulate on the outside surfaces of the filtering bags, and must be periodically removed, e.g., via scavenging air (compressed air).

In DE-A-4411988, a bag filter arrangement accommodates at least one filtering bag in a raw gas room, from which pure gas is removed, and the filtering bag is cleaned via internal pressurization with a gas burst (jet burst). Also known to this end is an arrangement for generating compressed air bursts (DE-U-9012518) for purification purposes, which contains a compressed air container equipped with compressed air connections, whose walls incorporate several, each separate diaphragm corner valves, to which are connected compressed air pipes that are routed transversely through the compressed air tank and can be hooked up to a bag filter system.

According to DE-A-3045759, the open end of each bag filter accommodates an air nozzle that is mounted in a frictional and form-fitting manner.

SUMMARY OF THE INVENTION

The object of the invention is to simplify the cleaning of dust filters with compressed air and reduce the structural outlay for preparing the compressed air. The object is achieved by designing the pure gas room as a compressed air tank.

This makes it possible to eliminate the individual supply lines and control fittings to a large extent, and the intermediate floor between the pure gas and raw gas room accommodates only those air nozzles allocated to the filter elements that can be individually actuated. The lid acts as a cover and compressed air tank all in one.

The omission of fittings for scavenging and control air simplifies the assembly and maintenance, and just a general supply of compressed air is now necessary. The available room can be optimally used, or the necessary room can be tangibly reduced.

As usual, a filter casing contains a supply line for dust-carrying raw gas to route the raw gas into the filter casing (raw gas room), and hence to the filter elements. Discharge arrangements for the accumulated dust particles are arranged in the lower area of the raw gas room, under the filter elements. The raw gas room is separated from the pure gas room by an intermediate floor. The intermediate floor accommodates both the attachments for the filter baskets of the filter elements, along with the tank floor air nozzles/valves for cleaning the filter elements.

In the following, the invention will be described in more detail in an embodiment of a bag filter based on a drawing. The drawing shows:

DESCRIPTION OF THE PREFERRED EMBODIMENTS

Figure 1:
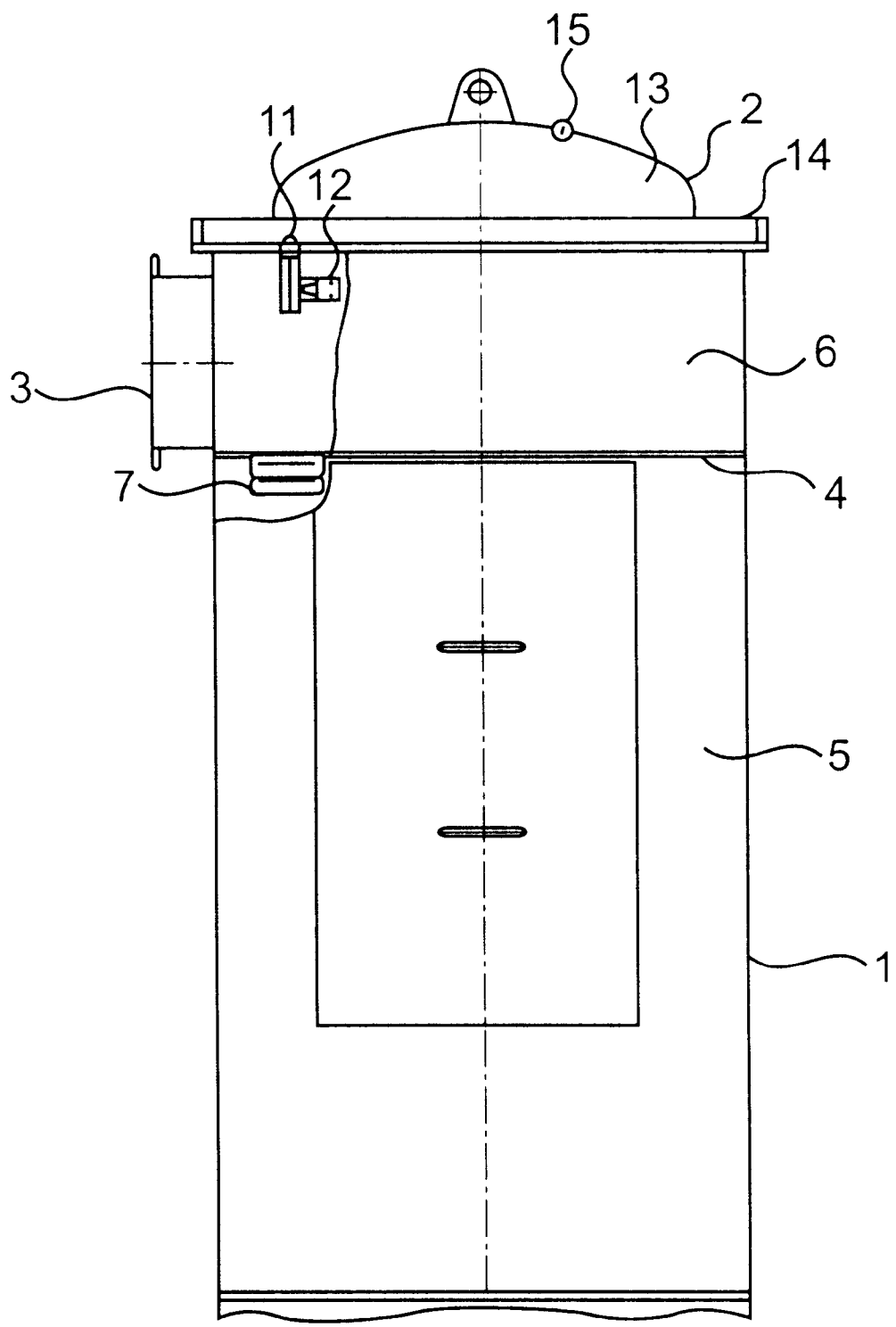
FIG. 1: the top part of a bag filter, partially cut.

A bag filter exhibits a casing 1 with a lid 2, a dust discharge (not shown) along with a raw gas inlet and pure gas outlet 3. Filtering bags 7 are mounted in a frictional and form-fitting manner on an intermediate floor 4 that separates the raw gas room 5 from the pure gas room 6. The filtering bag 7 is accommodated in a filter basket 8, and the detachable connection on the intermediate floor 4 is made by means of a basket connection piece 9 and known attachment means not explicitly shown.

Figure 2:
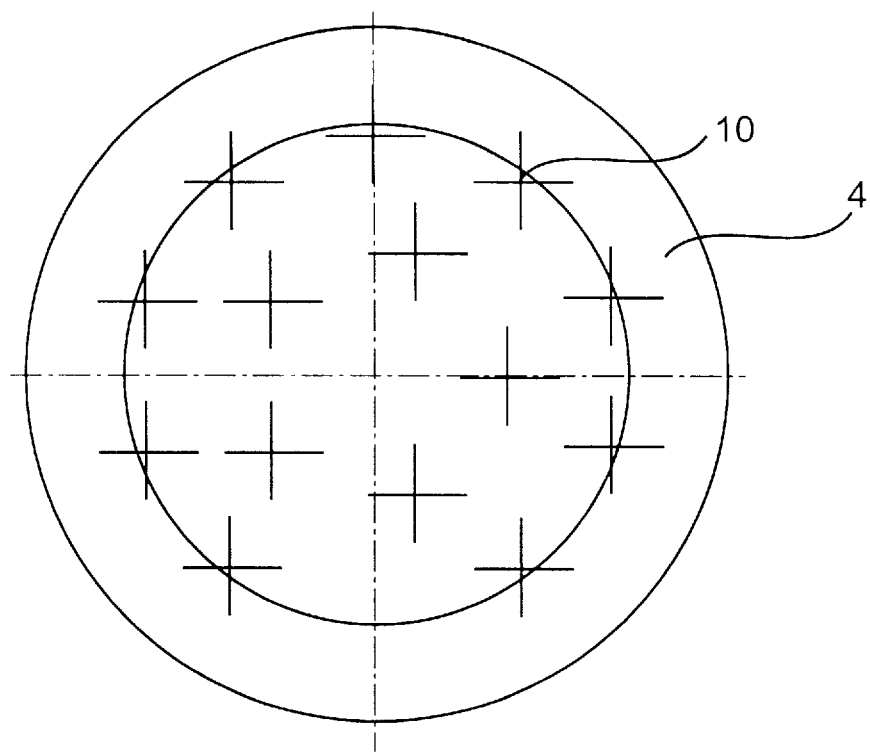
FIG. 2: the intermediate floor with delineated filtering bag arrangement.
Figure 3:
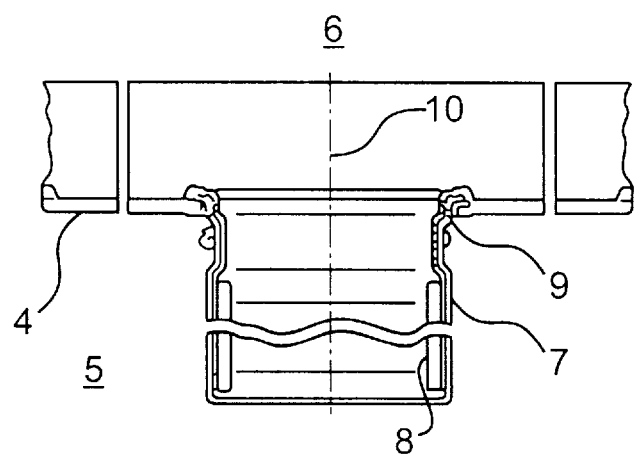
FIG. 3: a diagrammatic sectional view of a filter basket attachment.

One possible variant for a filter arrangement on the intermediate floor 4 is shown on FIG. 2 via delineated axes 10. The filtering bags 7 are preferably vertically suspended when installed, and pressurized by dusty air (raw gas) from outside, with the purified air escaping through the filtering bag 7 in an axial direction into the pure gas room 6, and from there to the pure gas outlet 3. To clean the filtering bags 7, a short and powerful compressed air burst is sent through a scavenging air nozzle 11 into the filtering bag 7 against the normal direction of flow at predetermined time intervals. The scavenging air nozzle 11 is actuated by a solenoid valve 12, and each filtering bag 7 has a scavenging air nozzle 11 allocated to it. In turn, the solenoid valves 12 are connected with an electronic control unit (not shown), which enables various scavenging cycles. The scavenging air nozzles 11 are situated centrally to the axis 10.

The compressed air is made available via a shared pressure room 13, which is situated above the pure gas room 6, and consists of a lid 2 and a floor 14 limiting the pure gas room 6 toward the top. The compressed air itself is provided via a connection piece 15 furnished with a valve in a known manner. The pressure room 13 is continuously under a blast pressure of approx. 0.5 bar.

The arrangement according to the invention can be used to divide up the cross sectional surface of the filter in a manner optimal for filtration. The filtering bags 7 and scavenging air nozzles 11 can be distributed as desired, so that the necessary surface decreases, and so too does the diameter of the casing 1, at a comparable filter performance relative to prior art. On the other hand, a higher number of filter elements can be incorporated while keeping the cross section the same. The number of parts to be mounted is reduced, an improved module assembly is ensured, and fewer adjustments have to be made. The scavenging air nozzles 11 lying inside are arranged in such a way as to protect them against damage. The manufacturing outlay for the floor 14 is also reduced. Since the lid 2 must be rated for higher pressures anyway, there is only a slight increase in cost relative to prior art.

The lid 2 is designed as a torospherical head, but can also be shaped like a hemisphere.

The invention is not limited to this embodiment. For example, filter candles or filter cartridges can also be used in place of the filtering bags 7.

KEY

1. Casing
2. Lid
3. Pure gas outlet
4. Intermediate floor
5. Raw gas room
6. Pure gas room
7. Filtering bag
8. Filter basket
9. Basket connection piece
10. Axis
11. Scavenging air nozzle
12. Solenoid valve
13. Pressure room
14. Floor
15. Connection piece

What is claimed is:

1. Dust filter apparatus for removing dust from gas, the apparatus comprising a casing with a lid, a raw gas room with a raw gas inlet and a pure gas room with a pure gas outlet, an intermediate floor separating the raw gas room from the pure gas room, and one or more filter element arranged in the casing on the intermediate floor through which the raw gas flows into the pure gas room, wherein associated with each filter element is a scavenging nozzle with a control unit for cleaning control which releases compressed gas through the associated nozzle in bursts, wherein the apparatus further comprises a shared pressure room located outside the pure gas room, the shared pressure room defined in part by said lid, and which is constantly under a scavenging gas pressure and is operatively connected to supply compressed gas to the scavenging gas nozzle.

2. Dust filter apparatus according to claim 1, wherein associated with each scavenging gas nozzle is an electrically controlled valve or a pneumatically controlled valve as the control unit.

3. Dust filter apparatus according to claim 1, wherein the lid includes a torospherical head or hemisphere.

4. Dust filter apparatus according to claim 1, wherein a plurality of the filter elements are arranged in the casing in the intermediate floor.

5. Dust filter apparatus according to claim 1, wherein the one or more filter elements are filtering bags, filter hoses, filter candles, or filter cartridges.

6. Dust filter apparatus according to claim 1, wherein the lid also defines in part the shared pressure room.

7. Dust filter apparatus according to claim 1, wherein the shared pressure room is positioned vertically above the pure gas room.

8. Dust filter apparatus according to claim 1, wherein the lid further includes a floor positioned to separate the shared pressure room from the pure gas room.

9. Dust filter apparatus according to claim 8, wherein the nozzles are positioned in the floor of the lid.

10. Dust filter apparatus according to claim 1, wherein the pure gas room is positioned between the shared pressure room and the raw gas room.

11. Dust filter apparatus according to claim 1, wherein the filter elements are carried by filter baskets which are detachable from the intermediate floor along with the associated filter elements.

12. Dust filter apparatus according to claim 1, wherein the direction of flow of the compressed gas bursts is vertically downward and counter to the direction of raw gas flow through the filter elements.

13. Dust filter apparatus according to claim 1, wherein the nozzles are directly connected to the shared pressure room.

* * * * *